(No Model.)
W. F. SCHMIDT.
CHUCK OR TOOL HOLDER.
No. 434,406. Patented Aug. 12, 1890.
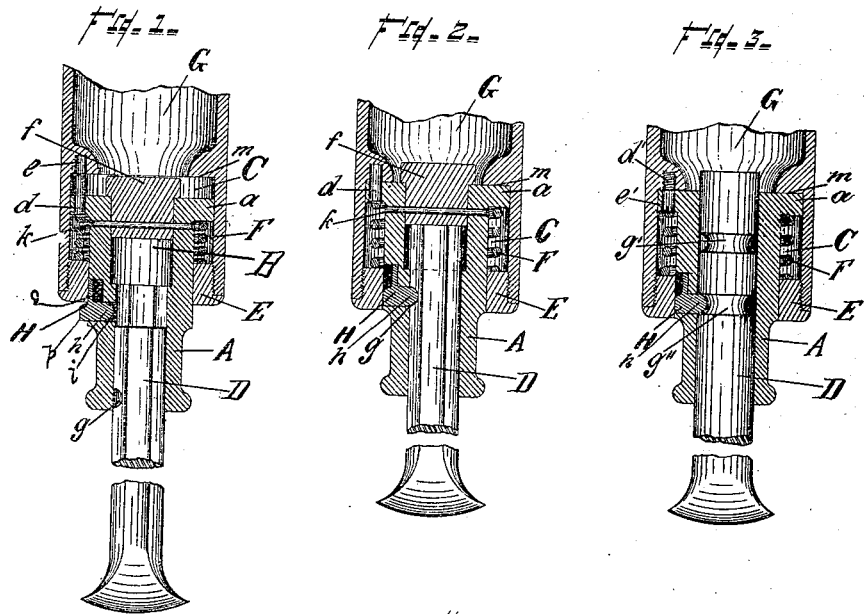
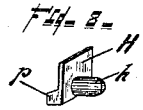
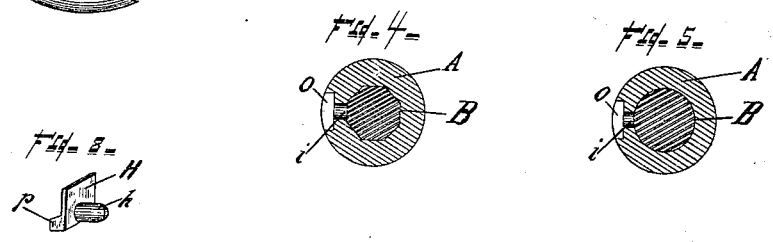
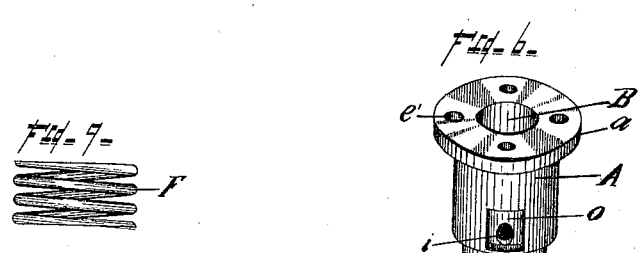
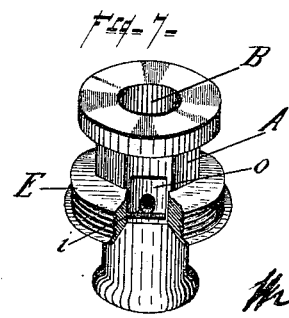
Witnesses.
A. R. Ramel.
Wm. M. Byrne.
Inventor.
William F. Schmidt
by Paul Bakewell
his attorney

UNITED STATES PATENT OFFICE.

WILLIAM F. SCHMIDT, OF ST. LOUIS, MISSOURI.

CHUCK OR TOOL-HOLDER.

SPECIFICATION forming part of Letters Patent No. 434,406, dated August 12, 1890.

Application filed March 24, 1890. Serial No. 345,024. (No model.)

*To all whom it may concern:*

Be it known that I, WILLIAM F. SCHMIDT, a citizen of the United States, residing in the city of St. Louis, in the State of Missouri, have invented certain new and useful Improvements in Chucks or Tool-Holders, of which the following is a full, clear, and exact description.

My invention relates to improvements in that class of appliances attached to the tool end of an engine or tool-manipulating machine or device adapted to removably secure a tool thereto, and has for its object to provide a tool-holder the operative parts of which will be incased within a shell and at the same time permit the tool-holder to rotate independent of the casing or locked thereto, as desired; also, to provide means whereby the tool may be either rigidly or loosely secured within the holder, as desired.

With these and minor objects in view my invention consists of certain novel features of construction and combinations of parts, which will be more fully described, and distinctly pointed in the following specification and claims.

While the chuck constructed and operating as hereinafter described is an adaptation of the chuck to the extended tool end of a direct-acting hand-engine, it is obvious that the chuck could be constructed separate from the engine and be adapted, without changing the essential features of my invention, to be used with any other machine or device to which it is desirable to attach a tool.

In the accompanying drawings, Figures 1, 2, and 3 are diametrical sections taken longitudinally through the chuck. Fig. 1 shows the tool-holding part of the chuck partly withdrawn and tool partly removed. Fig. 2 shows the tool-holding part of the chuck in its normal position with tool inserted and locked in. Fig. 3 shows the tool-holding part of chuck in same position as Fig. 2, with tool inserted, and shows the circular form of tool-shank and the same extended. Figs. 4 and 5 are cross-sections of the tool-holding part of chuck, showing respectively the non-circular and circular opening in same for tool. Figs. 6 and 7 are respectively perspective views of the tool-holding part of chuck and a modified form of the same. Figs. 8 and 9 are respectively perspective views of the locking device and the retaining-spring.

Like letters of reference denote like parts in the several drawings.

The tool end of the engine G is extended and bored out, so as to form the casing for the chuck and the abutting shoulder $m$. The tool-holding piece A of the chuck is extended, forming the circular flange $a$, which fits in the chuck-chamber C. When the piece A is pushed home against the shoulder $m$ by the spiral spring F, its exterior end extends somewhat beyond the retaining and guide-flange ring E, which is secured to the casing of the chuck and fits around the piece A. The piece A is longitudinally hollowed out, forming the tool-chamber B in one end. The anvil-block $f$ is let into the inner end of the tool-chamber B, and secured therein, preferably, by a bolt $k$. There are one or more steady-pins $d$ let into and secured to the flange $a$, and holes $e$, to accommodate the same, formed in the shoulder $m$. A recess $o$ and hole $i$ are cut in the side of the piece A, to accommodate the body $p$ and locking-bolt $h$ of the fastening-piece H. A recess $g$ is cut in the shank end of the tool to receive the locking-bolt $h$.

In operation the projecting end of the piece A is grasped and pulled out to such an extent that the fastening device H is beyond the control of the flange-ring E, or so that the locking-bolt $h$ can be withdrawn. When in this position, the piece A is given a slight turn or twist to move the pins $d$ out of line with the holes $e$ and allow the end of said pins to rest against the shoulders $m$, and thereby hold the piece A in position to receive the shank of the tool. The tool is then inserted and the piece A turned, so that the pins $d$ can again enter the holes $e$, when the spring F will force the piece A back to its normal position. In this backward or inward movement of the piece A the locking device H is pushed toward the center of the chuck by abutting against the inner edge of the flange-ring E, thereby forcing the locking-bolt $h$ into the recess $g$ in the tool. The steady-pins $d$, or in their modified form $d'$, as shown in Fig. 3, keep the piece A from turning independently of the casing of the chuck. The same result could be accomplished by dispensing with the steady-pins $d$ and making the exterior form of the body of the piece A non-cylindrical and the corresponding opening in the flange-ring E non-circular, as shown in Fig. 7. Should it be desirable to revolve the tool-holding part of the chuck independently of the casing of the chuck, the body of the piece A is made cylindrical, as shown in Figs. 1, 2, and 3, and the steady-pins $d$ removed. When it is not desirable that the tool revolve in its holder independently thereof, the shank of the tool D is made non-cylindrical and the corresponding opening in the tool-chamber B non-circular, as shown in Figs. 1 and 2 and in Fig. 4. When, on the other hand, it is desirable to revolve the tool independently of its holder, the shank end of the tool is made cylindrical and the tool-chamber bored out cylindrically, as shown in Figs. 3 and 5, and the recess $g$, cut in the tool to receive the locking-bolt $h$, is extended so as to form the circumferential groove $g'$. (Shown in Fig. 3.) In case it is desirable to give a direct blow on the tool the intermediate anvil-block $f$ may be omitted and the tool-shank D lengthened and provided with an extra recess or groove $g''$, as shown in Fig. 3.

I claim—

1. In a chuck, the combination, with an outer casing having an annular abutting shoulder on its inner surface, of a tool-holder adapted to slide within the casing and provided with a flange adapted to bear against said abutting shoulder, movable fastening-piece carried by the tool-piece, a guide-ring encircling said tool-holder and secured in the end of the casing, and an interposed spring, substantially as and for the purposes described.

2. In a chuck, the combination, with the casing having an internal abutting shoulder and a guide-ring removably secured within its end, of a flanged tool-piece sliding within the casing and provided at one end with an anvil-block, an interposed spring adapted to hold said tool-piece against said abutting shoulder, and a locking-bolt adapted to engage the shank of the tool, substantially as and for the purposes described.

3. In a chuck, the combination, with the casing having an annular abutting shoulder, of a flanged tool-piece adapted to slide within the casing and provided with a tool-fastening piece, a guide-ring encircling said tool-piece and fitted in said casing, a spring encircling said tool-piece intermediate the flange thereon and the guide-ring, said flange being provided with pins adapted to engage recesses in the abutting-shoulder, and a locking device carried by the tool-piece, substantially as and for the purposes described.

4. In a chuck, the combination, with the outer casing having an annular shoulder on its inner face, of a sliding tool-piece guided in said casing and having a flange thereon provided with pins engaging holes in said shoulder, a spring for holding said tool-piece against said shoulder, an anvil-block in the chamber of said tool-piece, and a tool-fastening device carried by the tool-piece, substantially as and for the purposes described.

In testimony whereof I have affixed my signature, in presence of two witnesses, this 18th day of March, 1890.

WILLIAM F. SCHMIDT.

Witnesses:
 PAUL BAKEWELL,
 JOS. W. CROOKES.